3,073,701
POULTRY TENDERIZATION METHOD
Robert L. Niblack, La Grange, and Ralph W. Kline, Oak Lawn, Ill., assignors, by mesne assignments, to Armour and Company, Chicago, Ill., a corporation of Delaware
No Drawing. Filed May 29, 1959, Ser. No. 816,679
15 Claims. (Cl. 99—107)

Our process relates to poultry tenderization and more particularly to a process for the enzymatic tenderization of poultry carcasses.

Processes for tenderizing meats with enzymes are well-known and widely utilized, however, these processes have not been adaptable to the tenderization of poultry for several reasons. The primary difficulty faced by the researcher in this field resides in the fact that enzyme activity is greatest at the surface of the object to be tenderized. It is essential that the carefully cultivated appearance of the poultry skin be unchanged, especially where the bird is to be roasted or the sales value of the bird will be greatly reduced.

We have found that poultry, or pieces of poultry carcasses, can be tenderized without damage to the skin through our simple and unexpectedly effective process. Our process comprises contacting a warm fowl carcass with a cold aqueous enzyme solution containing no collagenolytic enzymes. After the poultry carcass has been so treated, it can be canned or frozen for future use or packaged for direct sale.

In our process, freshly killed, defeathered and eviscerated poultry carcasses having a temperature of about 60–150° F. are soaked for 12–36 hours in an aqueous enzyme solution maintained at about 28 to about 45° F., washed thoroughly, if necessary, with water and packaged as desired. We prefer to soak carcasses having an initial temperature of about 85–90° F. for about 24 hours in an enzyme solution which is maintained at 32° F.

The enzymes utilized in our process have substantially no activity against collagen, i.e. have no collagenolytic activity, and good activity against muscle proteins and elastin, i.e. are proteolytic. Three enzyme preparations having such activity are the commercial fungal enzymes Protease 15, also known as Rhozyme W-15, a bacterial enzyme product obtained from *Bacillus subtilis*, Rhozyme A-4, a fungal enzyme product derived from *Aspergillus oryzae*, and aqueous sodium chloride extracts of ground pancreas and duodenum. Other enzymes having desired properties are known. We prefer to use the enzymes extracted from pancreas and duodenum by sodium chloride in aqueous solution.

As it is well-known that proteolytic enzymes do not tend to penetrate flesh to any great extent, much less animal skins, it is surprising that the enzyme contained in dilute solutions containing at least 500 p.p.m. and preferably at least 900 p.p.m of enzyme, pass through poultry skins and into the flesh when poultry carcasses are treated by our process. In carrying out our process, we prefer to utilize solutions containing no more than about 10,000 p.p.m. proteolytic enzymes, but can use higher concentrations.

It should be understood that the enzyme concentration and temperature of the solution determine the treatment time to a large extent. Thus, we prefer to immerse fowl carcasses in a 1,000 p.p.m. pancreatic-duodenal saline extract maintained at a temperature of about 32° F. for about 24 hours, while a fowl carcass would be held in a 28° F. solution containing 10,000 p.p.m. of the same enzyme extract for a shorter period of time.

The packaging process will determine whether it is necessary to wash the poultry carcasses after enzyme treatment. Where the poultry carcasses are to be frozen until used or baked immediately, there is little need for the washing step. If the carcasses are to remain at temperatures at which the enzyme is appreciably active for extended periods of time, it is better to wash the enzymes from the surface of the carcasses. We prefer to wash the carcasses immediately after enzyme treatment.

The following examples more fully describe our process, however, we do not intend to limit our process to the exact enzymes, times, enzyme concentrations, etc. disclosed. Rather, we intend to include within the scope of our claims, all equivalents obvious to those skilled in the art.

Example I

To prepare a pancreatic enzyme mixture, a 450 gram portion of fresh, frozen, ground, porcine pancreas and a 45 gram portion of fresh, ground, porcine duodenum were suspended in 1500 ml. of ice cold 1% sodium chloride. The pH of the suspension was adjusted to pH 7.0 with 4 N sodium hydroxide (14 ml.) and the suspension was stirred for 4 hours at 1° C. The suspension was passed through cheese cloth to remove the large tissue particles, a filter aid was added to the filtrate and the mixture was refiltered with suction at 1° C. through a Buchner funnel. Approximately 1400 ml. of filtrate were collected in one hour. This solution was immediately frozen and had a proteolytic activity, in a standard hemoglobin assay at pH 7.4 (37° C.) of 39 mg. tyrosine per ml.

Example II

To determine the effect of various enzymes on poultry carcasses, several aqueous enzyme solution were prepared containing various enzyme preparations. Pancreatin (a pancreatic extract containing collagenase), Age-It (a papain and protein hydrolysate enzyme preparation, pure papain and the extract of Example I were incorporated into halves of 3–6 lb. Beltsville turkeys by submerging the warm turkey halves (70° F.) into an air agitated water-ice solution of each enzyme until the bird halves were cooled to below 35° F. The halves were water washed to remove any enzyme remaining on the skin or the carcass halves and frozen until they could be cooked. Prior to cooking, the birds were basted with melted butter and placed in a 500° F. oven for 30 minutes. After this browning period, the bird halves were covered with aluminum foil and baked at 325° F. to an internal breast temperature of 190° F. Pancreatin and Age-It produced undesirable cooking odors while the other enzyme preparations gave no undesirable odors.

Example III

Following the procedures of Example II, 6 lots of six 3–6 lb. whole Beltsville turkey carcasses were treated utilizing the following aqueous enzyme solutions:

(1) 70° F. water containing ten p.p.m. aureomycin,
(2) An ice-water slush,
(3) Ice-water slush containing 10 p.p.m. papain (Optimo),
(4) Ice-water slush containing 100 p.p.m. papain, and
(5) Ice-water slush containing 1,000 p.p.m. pancreatic extract of Example I.

After the birds were baked, they were allowed to cool for one hour. A plug, having a one inch square surface, as long as possible, was cut from each side of the breast. The skin was included on each plug. The plug was sheared by a Warner-Bratzler shear apparatus. Each plug was sheared five times. The average results of the shear tests are set out in the following table:

| Treatment Number | 1 | 2 | 3 | 4 | 5 |
|---|---|---|---|---|---|
| Average Shear Value | 26.39 | 28.17 | 29.88 | 29.45 | 22.15 |

Thus, the turkeys of group 5 were, on the average, 21.4% more tender than turkeys processed by the usual method (treatment 2) while other treatments showed no significant reduction in bird carcass tenderness. An organoleptic examination of the roasted turkeys showed that papain "dissolved" the exterior of the birds, producing skin disintegration and mushing of the exterior tissue. The leg bones and spine of the papain treated birds were exposed and a red color usualy resulted. The papain mushed tissue dried out during baking and was usually rated tougher than controls by persons eating it. The group of birds treated with the pancreatic extract (group 5) showed no noticeable change in appearance, the skin remained intact and no off flavor was noted.

*Example IV*

To obtain results similar to the results of Example III with chicken and duck carcasses, the carcasses are treated by the process of Example III.

*Example V*

To obtain results similar to the results of Example III utilizing Rhozyme A-4 enzyme solutions, the procedure of Example II is followed with the exception that the carcasses, or pieces of carcasses, remain submerged for about 30 hours.

Now having described our invention, what we claim is:

1. A process for tenderizing poultry carcasses comprising submerging a poultry carcass having a temperature of about 60–150° F. for about 12–36 hours in an aqueous solution containing at least 500 p.p.m. of a non-collagenolytic, proteolytic enzyme maintained at a temperature of 28–45° F.

2. The process of claim 1 wherein the carcass is that of a turkey.

3. The process of claim 1 wherein the carcass is that of a duck.

4. The process of claim 1 wherein the carcass is that of a chicken.

5. The process of claim 1 wherein the non-collagenolytic, proteolytic enzyme is characterized by being obtained from pancreas and duodenum by extraction into aqueous sodium chloride solutions.

6. The process of claim 1 wherein the carcass is water washed after submersion in the aqueous solution of enzyme.

7. A process for tenderizing poultry carcasses comprising submerging a poultry carcass having a temperature of 85–90° for about 12–36 hours in an aqueous solution maintained at 28–45° F. and containing at least 500 p.p.m. of a non-collagenolytic, proteolytic enzyme characterized by being obtained from pancrease and duodenum by extraction into aqueous sodium chloride solution.

8. A process for tenderizing poultry carcasses comprising submerging a poultry carcass having a temperature of 85–90° for about 24 hours in an aqueous solution maintained at 28–45° F. and containing at least 500 p.p.m. of a non-collagenolytic, proteolytic enzyme characterized by being obtained from pancreas and duodenum by extraction into aqueous sodium chloride solution.

9. A process for tenderizing carcasses comprising submerging a poultry carcass having a temperature of 85–90° for about 24 hours in an aqueous solution maintained at about 32° F. and containing at least 500 p.p.m. of a non-collagenolytic, proteolytic enzyme characterized by being obtained from pancreas and duodenum by extraction into aqueous sodium chloride solution.

10. The process of claim 9 wherein the poultry carcass is that of a turkey.

11. The process of claim 9 wherein the poultry carcass is that of a chicken.

12. The process of claim 9 wherein the poultry carcass is that of a duck.

13. The process of claim 9 wherein the poultry carcass is water washed after submersion in the aqueous solution of non-collagenolytic, proteolytic enzyme.

14. A process for tenderizing poultry carcasses comprising submerging a poultry carcass having a temperature of about 60–150° F. in a relatively cold dilute protein-reactive aqueous solution containing at least 500 p.p.m. of a non-collagenolytic, proteolytic enzyme, said solution being liquid and having a temperature capable of bringing about a rapid lowering of the temperature of said poultry carcass.

15. A process for tenderizing poultry carcasses comprising submerging a poultry carcass having a temperature of about 60–150° F. for about 12–36 hours in a relatively cold dilute protein-reactive aqueous solution containing at least 500 p.p.m. of a non-collagenolytic, proteolytic enzyme, said solution being liquid and having a temperature capable of bringing about a rapid lowering of the temperature of said poultry carcass.

References Cited in the file of this patent

UNITED STATES PATENTS

| | | |
|---|---|---|
| 2,825,654 | Vaupel | Mar. 4, 1958 |
| 2,904,442 | Underkofler | Sept. 15, 1959 |